United States Patent
Feygin

(10) Patent No.: US 6,177,770 B1
(45) Date of Patent: Jan. 23, 2001

(54) ARTICLE COMPRISING AN INCREMENTAL POSITIONER

(75) Inventor: Ilya Feygin, Mountainside, NJ (US)

(73) Assignee: Pharmacopeia, Inc., Princeton, NJ (US)

(*) Notice: Under 35 U.S.C. 154(b), the term of this patent shall be extended for 0 days.

(21) Appl. No.: 09/395,132

(22) Filed: Sep. 14, 1999

(51) Int. Cl.⁷ .................................................... H02K 7/10
(52) U.S. Cl. ............................................ 318/9; 73/864.34
(58) Field of Search ........................ 318/9; 73/864.11, 73/864.14, 864.21, 864.34; 74/29, 30, 32

(56) References Cited

U.S. PATENT DOCUMENTS

| | | | |
|---|---|---|---|
| 3,667,306 | * | 6/1972 | Bush ..................................... 74/125.5 |
| 3,871,690 | * | 3/1975 | Wright et al. ........................ 285/226 |
| 4,016,774 | * | 4/1977 | Baker et al. ......................... 74/424.6 |
| 4,276,974 | * | 7/1981 | Ladin ...................................... 192/98 |
| 4,555,957 | * | 12/1985 | Frankel et al. ..................... 73/864.14 |
| 4,579,117 | * | 4/1986 | Spolyar ............................. 128/303 B |

* cited by examiner

Primary Examiner—Robert E. Nappi
Assistant Examiner—Rita Leykin
(74) Attorney, Agent, or Firm—DeMont & Breyer, LLC; Wayne S. Breyer; Jason Paul DeMont

(57) ABSTRACT

An incremental positioner is disclosed. In one embodiment, the incremental positioner includes a motor, a drive shaft, a motion converter and a rack. The motion converter engages the rack and, impelled by the motor and drive shaft, causes the rack to move. The motion converter transmits and converts the continuous rotary motion of the motor to a linear intermittent motion of the rack. To generate such intermittent motion, the motion converter is physically configured so that even though the motion converter is in constant motion, it urges the rack to move on a periodic basis. In other words, during each revolution of the motion converter, the rack "dwells" (i.e., does not move) during a first portion of the cycle, and advances during a second portion of the cycle. Each time the rack advances, it does so by a characteristic incremental distance.

14 Claims, 3 Drawing Sheets

ARTICLE COMPRISING AN INCREMENTAL POSITIONER

FIELD OF THE INVENTION

The present invention relates to motion controllers or positioning stages. More particularly, the present invention relates to a positioner capable of fast, incremental motion.

BACKGROUND OF THE INVENTION

In research and development laboratories, among other types of facilities, there are applications that require moving an element (e.g., test strips, a microtitre plate, etc.) a precise distance to a desired location to perform a function at that location. Typically, such movement must be accomplished in a repetitive manner at a precise time interval. Such a task can be performed by an incremental positioner/motion controller.

Sophisticated or "intelligent" motion controllers are often used for such service. Motion controller 100, depicted in FIG. 1, is typical of such intelligent controllers.

Intelligent motion controller 100 includes a control unit 102 and a motorized stage 110. Control unit 102 includes control means 104, depicted figuratively as a collection of switches and rheostats that control a variety of parameters related to stage movement. Control means 104 may control, for example, the direction of stage motion (e.g., forward or reverse), stage speed, coarse or fine stage movement, and the acceleration and deceleration of every movement. Hence the designation "intelligent."

A first cable 106 provides electrical connection between control unit 102 and motorized stage 110, and a second cable 108 attaches to a power supply. Motorized stage 110, which is depicted as a linear stage, includes a motor 112 that is operatively connected to a stage 114.

While such intelligent motion controllers are usually capable of positioning a stage to a high degree of resolution (i.e., about 1 micron accuracy for linear positioners and about 0.004° for rotary positioners), and are quite flexible within the parameters of their operation, they do suffer from several significant shortcomings. In particular, such motion controllers are relatively slow and they are rather expensive. Regarding cost, a motion controller having the capabilities of intelligent motion controller 100 may sell for over $2000 (at least about $800 for the control unit and about $1,200.00 for the motorized stage). Moreover, in view of the complexity of such devices, reliability may be an issue as well.

There may be some applications in which the flexibility offered by such an intelligent controller justifies its cost. There will, however, be many other applications in which process parameters remain fixed (e.g., the positional increment is fixed) so that it may be difficult to cost-justify such an intelligent motion controller. Also, high-speed positioning may be required, which may be beyond the capabilities of the aforedescribed intelligent controllers. Or, a smaller and less expensive system may be desired.

As such, the art would benefit from a fast, inexpensive and reliable incremental positioner.

SUMMARY OF THE INVENTION

In accordance with some embodiments of the present invention, an incremental positioner that avoids the shortcomings of the prior art is disclosed.

The present incremental positioner comprises an intermittent motion-imparting means that engages a rack ((i.e., a bar having a multiplicity of spaced teeth). The rack is characterized by a pitch, which is a characteristic incremental distance between the leading edge of successive teeth in the rack.

In the illustrated embodiments, the intermittent motion-imparting means comprises a drive means, such as a motor and drive shaft, and a motion converter. The motion converter transmits and converts the continuous rotary (or other) motion of the drive means to an intermittent motion (typically linear) of the rack.

To generate such intermittent motion, the motion converter is physically configured such that, even though the motion converter is in constant motion (while in operation), it urges the rack to motion on a periodic basis. In particular, given a cycle of the motion converter (i.e., the time for one rotation of the motion converter), the rack "dwells" (i.e., does not move) during a first portion of the cycle, and advances during a second portion of the cycle. Each time the rack advances, it does so by the aforementioned characteristic incremental distance.

The intermittent motion imparted to the rack can be used employed in a variety of applications. For example, in one embodiment of the present invention, the incremental positioner is used in conjunction with a dispensing operation, wherein the positioner advances a receiver, such as a microtitre plate. In this application, the rack is operatively engaged to a stage that receives the microtitre plate. Each advance of the rack incrementally advances the plate (e.g., row-by-row), such that successive rows of "wells" in the plate are positioned to receive liquid from a dispenser.

Unlike the prior art, wherein the drive means is disadvantageously successively energized and de-energized to cause incremental positioning, the drive means (e.g, motor, etc.) of the present invention is always on (during operation). Thus, no sophisticated controller is required to control motor operation and timing. Both the "dwell" and "advance" function is provided by the motion converter, which is typically a trivially inexpensive part. Notwithstanding its low cost, the motion converter provides much of the functionality of the control units of the intelligent motion controllers of the prior art.

The present incremental positioner is capable of very high speeds, which is primarily a function of the speed of the drive means. Comprising relatively few and simple mechanical parts, the present incremental positioner is expected to be very reliable. And, it is far less expensive to produce than the intelligent motion controllers of the prior art.

These and other features of the present invention, including a specific implementation of the motion converter, are described later in this Specification in the Detailed Description with reference to the attached Figures.

DETAILED DESCRIPTION

Figure 1:
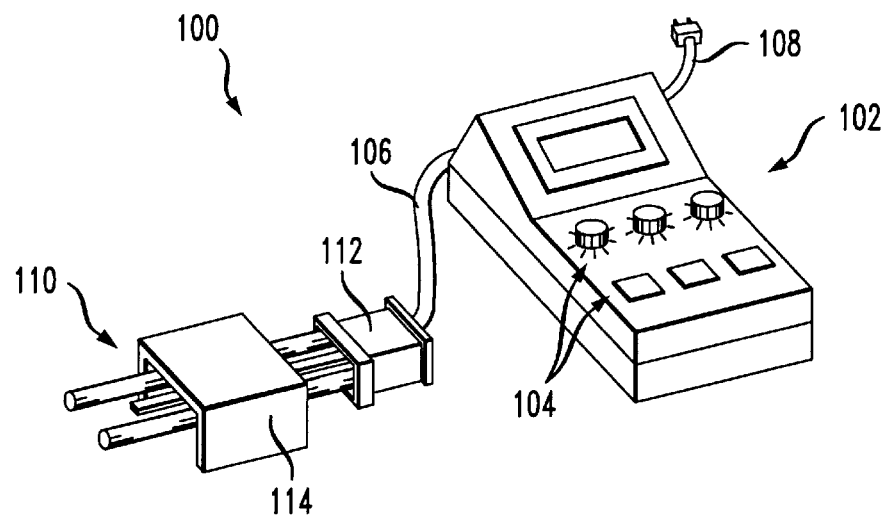
FIG. 1 depicts a prior art intelligent motion controller.
Figure 2:
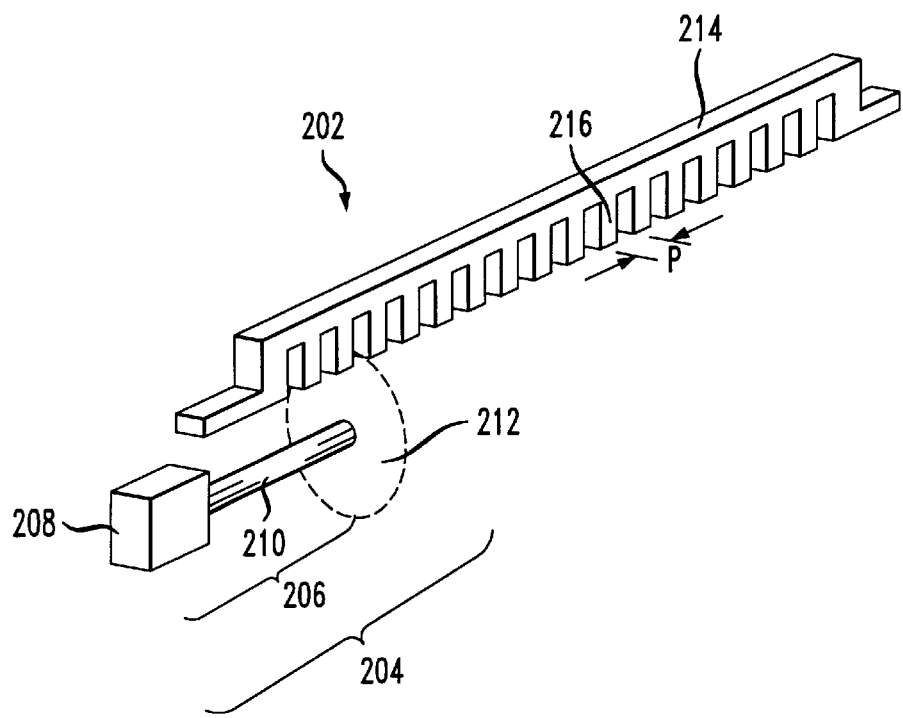
FIG. 2 depicts a perspective view of an illustrative embodiment of an incremental positioner in accordance with the present teachings.

FIG. 2 depicts a perspective view of an illustrative embodiment of an incremental positioner 202 in accordance with the present teachings.

Incremental positioner 202 comprises intermittent motion-imparting means 204 that engages rack 214 (i.e., a bar having a multiplicity of spaced teeth). In the illustrated embodiments, intermittent motion-imparting means 204 comprises a drive means 206, such as a motor 208 and drive shaft 210, and a motion converter 212. The motion converter transmits and converts the continuous rotary (or other) motion of drive means 206 to an intermittent motion (typically linear) of the rack 214.

In operation, motion converter 212 is operatively connected to drive means 206, such as by a direct connection to drive shaft 210. Typically, there is no "reduction" between drive means 206 and motion converter 212, so that the motion converter moves (e.g., rotates) at the speed of drive means 206.

During each "cycle" or "period" (e.g., time for one rotation) of its operation, motion converter 212 causes rack 214 to:

(1) dwell (i.e., remain motionless) for a predetermined amount of time; and
(2) advance.

Rack 214 is characterized by a pitch, P, which is a characteristic incremental distance between the leading edges of successive teeth 216 in rack 214. Each advance of rack 214 will therefore be some multiple of the characteristic incremental distance as a function of the physical configuration of motion converter 212 and the manner of its cooperative engagement with the rack.

The dwell and advance responses of rack 214 result from the physical configuration of motion converter 212. One configuration suitable for causing those responses is now described.

Figure 3:
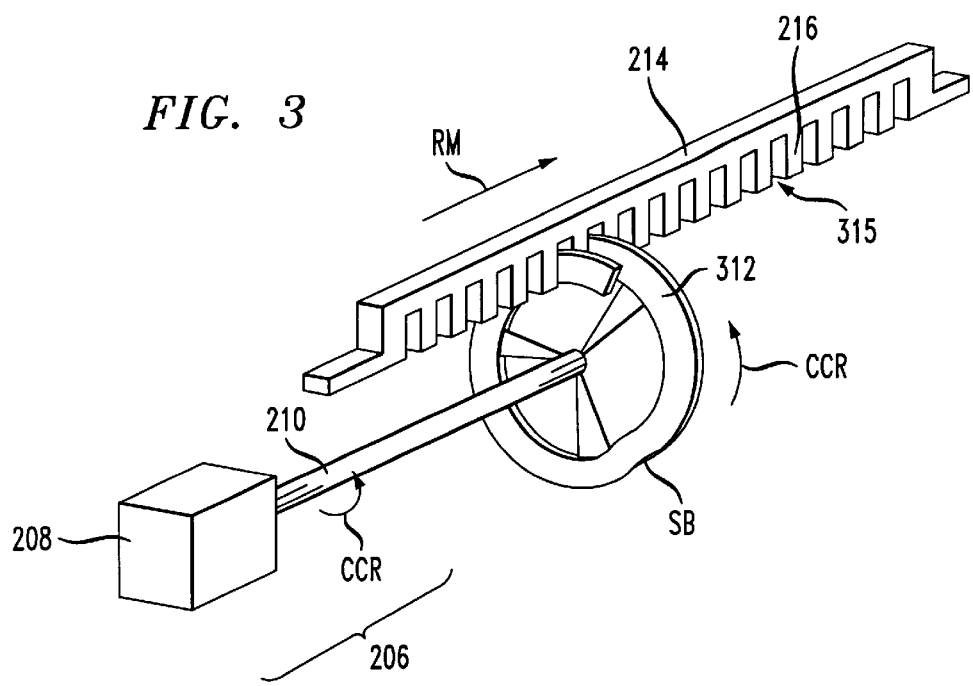
FIG. 3 depicts a perspective view of the incremental positioner of FIG. 2, wherein the motion converter is implemented as an offset washer.
Figure 4:
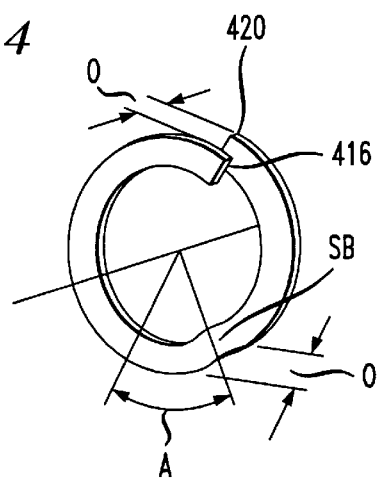
FIG. 4 depicts a perspective view of the drive washer of the incremental positioner of FIG. 3.
Figure 5:
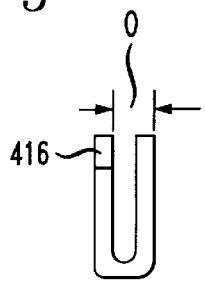
FIG. 5 depicts a side view of the drive washer of the incremental positioner of FIG. 3.

Referring now to FIGS. 3–5, motion converter 212 is realized as drive washer 312 that engages the spaces 315 between teeth 216 in rack 214. Drive washer 312 is not planar in form like a standard washer. Rather, soft bend SB in drive washer 312 creates an "offset" O therein. Offset O is in the direction of the required motion of rack 214. That is, in FIG. 3, soft bend SB bends "into the page" for rack motion along direction RM.

Offset O (i.e., the amount of the offset) in drive washer 312 is a multiple (e.g., x1, x2, etc.) of pitch P of rack 214. (In the "base" case, P=O.) Drive washer 312 is split at region 416, thereby forming first and second ends 418 and 420. In addition to facilitating the formation of the offset O, the split at region 416 provides a physical configuration by which drive washer 312 engages rack 214 and imparts a motion thereto in an amount equal to offset O.

In operation, drive washer 312 is urged into rotation via drive means 206. Each rotation of drive washer 312 advances rack 214 by offset O. If offset O is equal to pitch P, then rack 214 advances in an amount equal to the characteristic incremental distance (i.e., pitch P). If offset O is twice the pitch P, then rack 214 advances in an amount equal to twice the characteristic incremental distance.

As soft bend SB in drive washer 312 engages rack 214, the rack advances in a direction dictated by the rotational direction of drive means 206. For example, as depicted in FIG. 3, counter clockwise rotation CCR of drive means 206 and drive washer 312 result in linear motion of rack 214 along the direction RM.

Soft bend SB is advantageously implemented in a small portion of arc A of drive washer 312, since the smaller the arc A, the faster rack 214 advances. In particular, in some embodiments, soft bend SB is implemented in less than about a 30° arc radius of drive washer 312.

During the balance of the drive washer's rotation cycle, rack 214 "dwells" (i.e., is at a standstill). Since soft bend SB is implemented in a relatively minor portion (i.e., arc A) of drive washer 312, rack 214 dwells for a major portion of the drive washer's rotational period. Thus, fluid may be dispensed from a dispenser while the rack is stationary.

Figure 6:
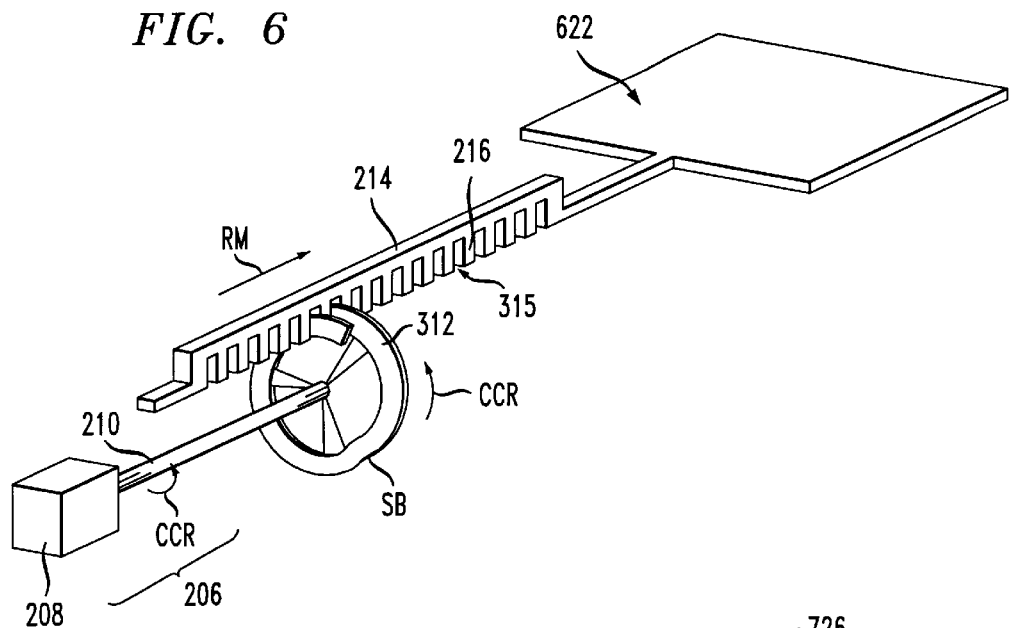
FIG. 6 depicts a perspective view of a further embodiment of the present invention, wherein a stage is attached to the rack.

The intermittent motion imparted to rack 214 can be used in a variety of applications. For example, in some embodiments of the present invention, the incremental positioner includes a stage 622, as depicted in FIG. 6. Stage 622 depends from rack 214, and, as such, is advanced as rack 214 moves.

Stage 622 is advantageously used, for example, to advance a receiver, such as a microtitre plate, that is disposed on the stage. In one particularly important application of the present teachings that is depicted in FIG. 7, the present invention further comprises a dispensing operation.

Figure 7:
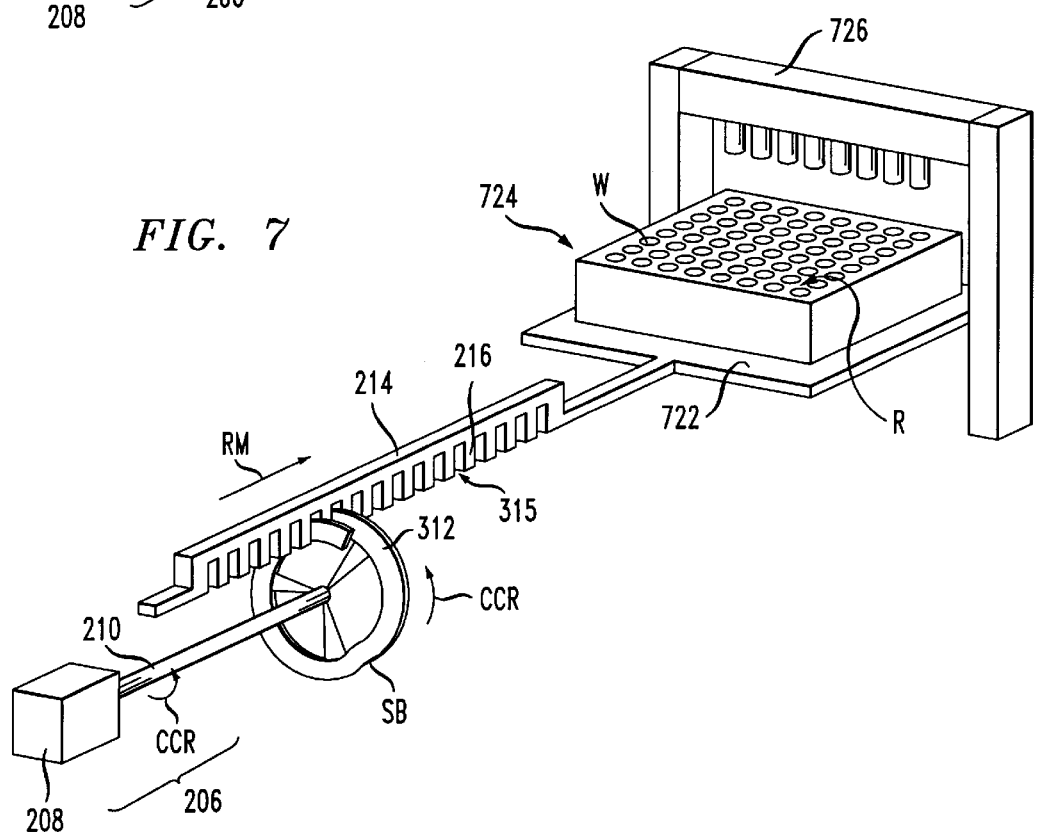
FIG. 7 depicts a perspective view of yet another embodiment of the present invention, wherein the stage is advanced to a fluid dispenser.

In the embodiment depicted in FIG. 7, a stage 722 that is physically configured to receive a microtitre plate depends from rack 214. In operation, rack 214, stage 722 and microtitre plate 724 resting thereon are advanced toward fluid dispensing apparatus 726. Each advance of rack 214 incrementally advances microtitre plate 724 (e.g., row-by-row) such that successive rows R of "wells" W in plate 724 are positioned to receive fluid from dispensing apparatus 726.

For the embodiment depicted in FIG. 7, the pitch P of the rack should be set equal to the center-to-center spacing of wells W (i.e., 2.25 millimeters (mm) for a 1536-well plate, 4.5 mm for a 384-well plate, and 9 mm for a 96 well plate).

System performance (e.g., output) is maximized by reducing, to a practical minimum, the overall time required for the dispensing operation. This is accomplished by advancing microtitre plate 724 as quickly as possible, and then having rack 214 dwell for a period of time no longer than is required for fluid to be dispensed from dispensing apparatus 726 into wells W of microtitre plate 724.

The present invention advantageously provides a rapid advancement by implementing soft bend SB in a relatively small portion of arc A, and provides the appropriate dwell time by suitably adjusting the speed of the drive means (e.g., motor). One embodiment, among many others, wherein such rapid advancement and appropriate dwell time is used to particular advantage involves using the present incremental positioner in conjunction with a fluid dispenser, thereby providing an improved fluid dispenser. In particular, the attributes of the present positioner facilitate dispensing of a "fast" liquid droplet into a stationary receiving well.

It is to be understood that the above-described embodiments are merely illustrative of the invention and that many variations may be devised by those skilled in the art without departing from the scope of the invention. For example, other suitable implementations of a device that provides the functionality of motion converter/rack arrangement can be developed by those skilled in the art in application of the principles disclosed herein. It is therefore intended that such variations be included within the scope of the following claims and their equivalents.

I claim:

1. An article comprising an incremental positioner, said incremental positioner comprising:
   a rack; and
   a drive washer in operative engagement with said rack, said drive washer comprising:
      a bend, said bend forming an offset in said drive washer across said bend in an axial direction;
      a split, said split defining a first end and a second end, wherein there is a gap between said first end and said second end in said axial direction, wherein;
      said offset is about equal in size to said gap.

2. The article of claim 1 further comprising a drive shaft mechanically connected to said drive washer.

3. The article of claim 2 further comprising a motor operatively connected to said drive shaft.

4. The article of claim 1, wherein:
   said rack comprises a plurality of teeth and a plurality of channels, and wherein:
      each tooth is separated from an adjacent tooth by one of said channels;
      a first of said channels receives said first portion of said drive washer; and
      a second of said channels receives said second portion of said drive washer.

5. The article of claim 4 wherein:
   said rack is characterized by a pitch;
   said offset in said drive washer is a first multiple of said pitch; and
   said rack is advanced an amount equal to said offset when said bend engages said second channel.

6. The article of claim 5 wherein:
   said pitch is a multiple n of 2.25 millimeters.

7. The article of claim 6, wherein n=1 to 4.

8. The article of claim 1 further comprising
   a stage depending from said rack.

9. The article of claim 8, wherein said stage is physically configured to receive a microtitre plate.

10. The article of claim 8 wherein said article is a fluid dispensing apparatus, said fluid dispensing apparatus comprising
    a fluid dispenser; wherein,
    said rack and said intermittent motion imparting device are operable to incrementally advance said stage toward said fluid dispenser.

11. The article of claim 10 wherein:
    said rack is characterized by a pitch;
    said pitch is a multiple of 2.25 millimeters; and
    said stage moves an amount equal to said pitch with each of said incremental advances.

12. An incremental positioner comprising:
    a motor;
    a drive shaft depending from said motor;
    a drive washer connected to said drive shaft, said drive washer having a bend therein, said bend forming an offset in said drive washer in an axial direction across said bend;
    a rack having a plurality of teeth and a plurality of channels, wherein each tooth is separated from an adjacent tooth by one of said channels;
    wherein said drive washer engages two of said channels.

13. The article of claim 12 wherein:
    said rack is characterized by a pitch that is a multiple of 2.25 millimeters; and
    said offset is equal to said pitch.

14. The article of claim 12 further comprising a stage depending from said rack.

* * * * *